United States Patent
Xia et al.

(10) Patent No.: US 9,019,642 B1
(45) Date of Patent: Apr. 28, 2015

(54) SYNCHRONIZATION MARK DETECTION FOR MULTI-DIMENSIONAL MAGNETIC RECORDING

(71) Applicant: LSI Corporation, San Jose, CA (US)

(72) Inventors: Haitao Xia, San Jose, CA (US); Rui Cao, San Jose, CA (US); Lingyan Sun, Longmont, CO (US); Lu Pan, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/243,539

(22) Filed: Apr. 2, 2014

(51) Int. Cl.
*G11B 5/09* (2006.01)
*G11B 20/10* (2006.01)

(52) U.S. Cl.
CPC ............ *G11B 20/10009* (2013.01); *G11B 5/09* (2013.01)

(58) Field of Classification Search
None
See application file for complete search history.

(56) References Cited

U.S. PATENT DOCUMENTS

| | | | |
|---|---|---|---|
| 5,268,798 A | 12/1993 | Shinn | |
| 7,881,164 B1 | 2/2011 | Han et al. | |
| 7,974,034 B1 | 7/2011 | Han et al. | |
| 8,190,831 B2 | 5/2012 | Lee et al. | |
| 8,300,339 B1 | 10/2012 | Nangare et al. | |
| 8,345,369 B2 | 1/2013 | Xia et al. | |
| 8,385,014 B2 * | 2/2013 | Yang | 360/31 |
| 8,479,086 B2 * | 7/2013 | Xia et al. | 714/795 |
| 8,499,231 B2 * | 7/2013 | Li et al. | 714/801 |
| 8,587,888 B2 | 11/2013 | Haratsch et al. | |
| 8,599,508 B1 | 12/2013 | Burd | |
| 8,614,858 B2 | 12/2013 | Yang et al. | |
| 8,638,513 B1 | 1/2014 | Burd | |
| 8,681,441 B2 * | 3/2014 | Yang et al. | 360/39 |
| 8,699,167 B2 * | 4/2014 | Xia et al. | 360/65 |
| 8,767,333 B2 * | 7/2014 | Xia et al. | 360/65 |
| 8,773,794 B2 * | 7/2014 | Mathew et al. | 360/45 |
| 8,804,260 B2 * | 8/2014 | Mathew et al. | 360/45 |
| 8,810,940 B2 * | 8/2014 | Jin et al. | 360/39 |
| 8,837,068 B1 * | 9/2014 | Liao et al. | 360/51 |
| 8,854,753 B2 * | 10/2014 | Tan et al. | 360/39 |
| 8,861,109 B1 * | 10/2014 | Hwang et al. | 360/31 |
| 8,861,111 B1 * | 10/2014 | Liao et al. | 360/39 |
| 8,861,122 B1 * | 10/2014 | Hwang et al. | 360/55 |
| 2010/0115209 A1 | 5/2010 | Lee et al. | |
| 2011/0293031 A1 | 12/2011 | Zhang et al. | |
| 2013/0250447 A1 | 9/2013 | Erden | |

OTHER PUBLICATIONS

Sann et al., "Channel Models and Detectors for Two-Dimensional Magnetic Recording (TDMR)," IEEE Transactions on Magnetics, Mar. 2010, vol. 46, No. 3, 8 pages.
Hwang et al., Signal Processing for Near 10 Tbit/in2 Density in Two-Dimensional Magnetic Recording (TDMR), IEEE Transactions on Magnetics, Jun. 2010, vol. 46, No. 6, 4 pages.

* cited by examiner

*Primary Examiner* — Tan X Dinh
(74) *Attorney, Agent, or Firm* — Hamilton DeSanctis & Cha (57) ABSTRACT

A method for detecting an information pattern includes obtaining a first sample stream and a second sample stream. The first sample stream and the second sample stream are obtained by sensing recorded information at a target location of a storage medium using a first sensor and a second sensor, respectively. A first metric is computed by comparing the first sample stream to a reference pattern representative of a target information pattern to be detected. A second metric is computed by comparing the second sample stream to the reference pattern. A combined metric is computed by combining the first metric and second metric using a weighting function. The target information pattern is detected using the combined metric.

20 Claims, 5 Drawing Sheets

SYNCHRONIZATION MARK DETECTION FOR MULTI-DIMENSIONAL MAGNETIC RECORDING

FIELD OF THE INVENTION

The field generally relates to pattern detection and, in particular, to circuits and methods for detecting synchronization marks in read channels of disk storage devices.

BACKGROUND

Storage devices such as hard disk drives are used to provide non-volatile data storage in a wide variety of different types of data processing systems. In a magnetic storage system, a digital data sequence is written as a sequence of magnetic flux transitions onto the surface of a magnetic storage disk in concentric, radially spaced tracks at a predetermined baud rate, wherein each track is divided into a number of addressable sectors. Each sector includes a block of user data (e.g., encoded data, parity bits, etc.) which is preceded by synchronization information including a preamble pattern and a synchronization pattern (or "sync mark"), wherein a sync mark identifies the start point of the user data. Various pattern detection techniques have been developed for use in read channels to detect sync marks in data that is read from the magnetic storage medium using magnetic read heads. In order to achieve acceptable read performance, it is important to minimize the detection error rate for sync marks, and such sync mark detection becomes increasingly problematic with increasing bit densities on magnetic storage mediums. Multi-dimensional recording techniques such as TDMR (Two Dimensional Magnetic Recording) have been developed to support higher bit densities in magnetic recording systems. With TDMR systems, two or more read heads are used to read the same track with a certain read offset, wherein each read back signal picks up different noise. TDMR enables the use of effective coding and signal processing algorithms which allow data bits to be stored at higher densities on a magnetic storage disk, and retrieved and decoded with acceptable error rates. However, sync mark detection techniques that provide individual sync mark detection in separate read channels can experience poor detection results for read heads having low signal quality.

SUMMARY

In an embodiment of the invention, a method is provided for detecting an information pattern, such as a synchronization pattern. The method includes obtaining a first sample stream and a second sample stream. The first sample stream and the second sample stream are obtained by sensing recorded information at a target location of a storage medium using a first sensor and a second sensor, respectively. A first metric is computed by comparing the first sample stream to a reference pattern representative of a target information pattern to be detected. A second metric is computed by comparing the second sample stream to the reference pattern. A combined metric is computed by combining the first metric and second metric using a weighting function. The target information pattern is detected using the combined metric.

Other embodiments include, without limitation, circuits, systems, integrated circuit devices, storage devices, storage systems, and computer-readable media.

WRITTEN DESCRIPTION

Figure 1:
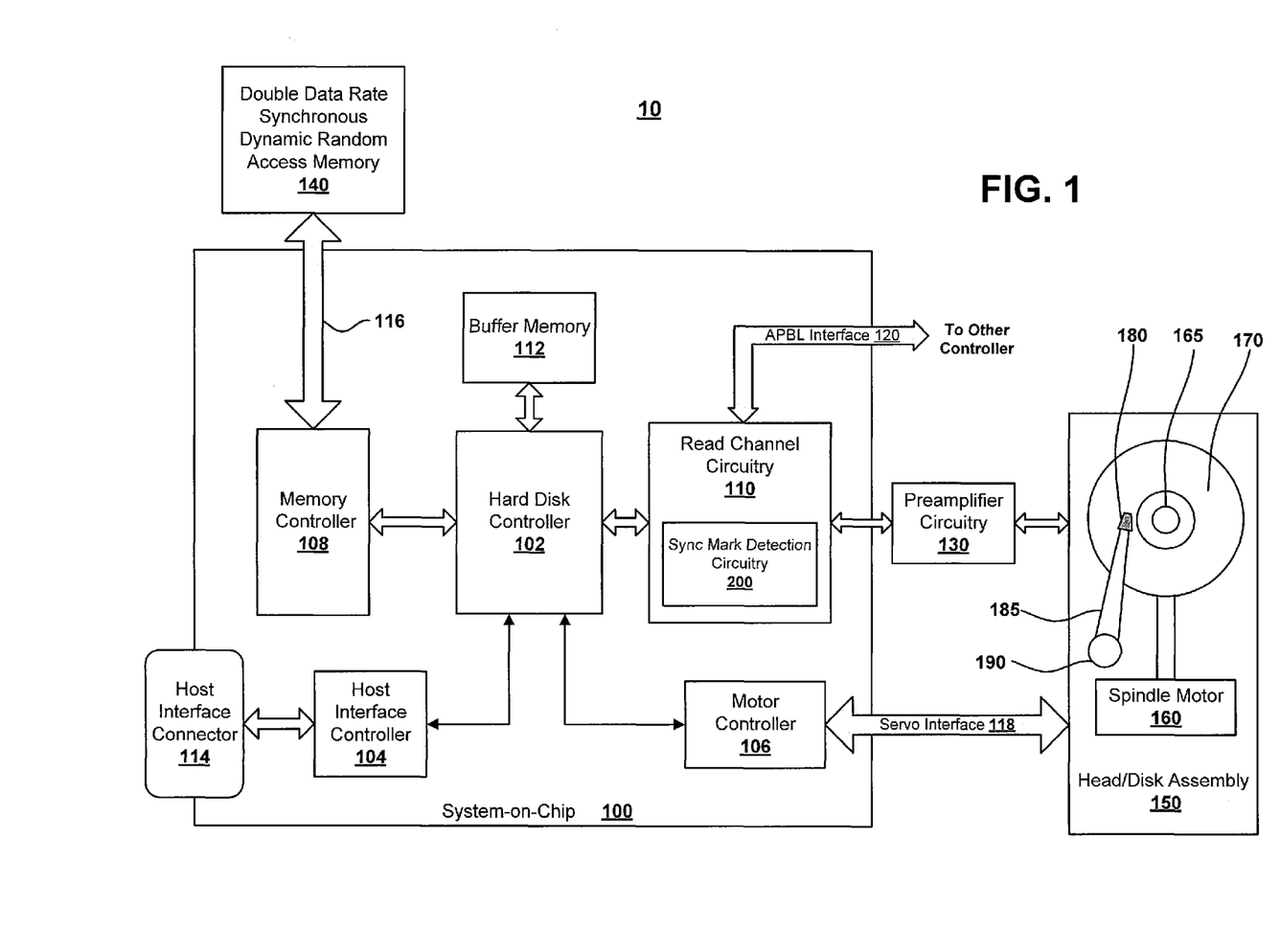
FIG. 1 schematically illustrates a storage device according to an embodiment of the invention.

FIG. 1 schematically illustrates a storage device 10 according to an embodiment of the invention. The storage device 10 comprises a system-on-chip 100 which includes various integrated circuits such as a hard disk controller 102, a host interface controller 104, a motor controller 106, a memory controller 108, read channel circuitry 110, and a buffer memory 112. The system-on-chip 100 further comprises a plurality of interfaces such as a host interface connector 114, a memory interface 116, a servo interface 118, and a bidirectional APBL (Advanced Peripheral Bus-Light) interface 120. The storage device 10 further comprises preamplifier circuitry 130, an external random access memory 140, and a read/write head and disk assembly 150.

The read/write head and disk assembly 150 comprises various components such as a spindle motor 160 and spindle 165, a storage disk 170, a magnetic read/write head 180 disposed on one end of a positioning arm 185, and an actuator motor 190 (or voice coil motor) connected to one end of the positioning arm 185 opposite the magnetic read/write head 180. The storage disk 170 has a storage surface coated with one or more magnetic materials that are capable of storing data bits in the form of respective groups of media grains oriented in a common magnetization direction (e.g., up or down). The storage disk 170 is connected to the spindle 165, and the spindle 165 is driven by the spindle motor 160 to spin the storage disk 170 at high speed. Data is read from and written to the storage disk 170 via the magnetic read/write head 180 mounted on the positioning arm 185. The actuator motor 190 comprises a permanent magnet and a moving coil motor, which operate to controllably swing the magnetic read/write head 180 into a desired position across the magnetic surface of the storage disk 170 as the storage disk 170 spins by operation of the spindle motor 160.

In general, a sequence of magnetic flux transitions corresponding to a digital data sequence are written onto the magnetic surface of the storage disk 170 using the magnetic read/write head 180. The digital data sequence serves to modulate current in the read/write head 180. The magnetic surface of storage disk 110 comprises a plurality of concentric tracks, wherein each track is subdivided into a plurality of sectors that are capable of storing a block of sector data for subsequent retrieval. The tracks located toward the outside edge of the storage disk 170 have a larger circumference when compared to those located toward the center of the storage disk 170. The tracks are grouped into several annular zones, where the tracks within a given zone have the same number of sectors. Those tracks in the outer zones have more sectors than those located in the inner zones. The outer zones of the storage disk 170 provide a higher data transfer rate than the inner zones. This is in part due to the fact that the storage disk 170, once accelerated to rotate at operational speed, spins at a constant angular or radial speed regardless of the positioning of the magnetic read/write head 180, but the tracks of the inner zones have smaller circumference than those of the outer zones. Thus, when the read/write head 180 is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention. Data bit density is generally constant across the entire storage surface of the storage disk 170, which results in higher data transfer rates at the outer zones. Moreover, the storage disk 170 further comprises timing patterns formed on the surface thereof, which comprise one or more sets of servo address marks (SAMs) or other types of servo marks formed in particular sectors in a conventional manner.

The host interface connector 114 represents a physical connector and associated input/output (I/O) bus wiring that connects the storage device 10 to a host system, device, I/O bus, or other components of a data processing system. The I/O data is moved to and from the storage device 10 through the host interface connector 114 under control of the host interface controller 104. The host interface controller 104 implements communication protocols for communicating with a host system or device and controlling and managing data I/O operations, using one or more known interface standards. For example, in one or more alternative embodiments of the invention, the host interface connector 114 and the host interface controller 104 are implemented using one or more of Small Computer interface (SCSI), Serial Attached SCSI (SAS), Serial Advanced Technology Attachment (SATA) and/or Fibre Channel (FC) interface standards, for example.

The hard disk controller 102 controls the overall operations of writing and reading data to and from the storage disk 170. In one embodiment of the invention, the hard disk controller 102 is an ARM (Advanced Reduced instruction set computing Machine). In other embodiments, the hard disk controller 102 may comprise other known architectures suitable for controlling hard disk operations. The read channel circuitry 110 encodes and decodes data that is written to and read from the storage disk 170 using the magnetic read/write head 180. The read channel circuitry 110 comprises sync mark detection circuitry 200 for detecting synchronization marks using circuits and methods as discussed below with reference to FIGS. 2, 3 and 4 according to embodiments of the invention. The read channel circuitry 110 comprises other types of circuitry that is commonly implemented to process data that is read from and written to the storage disk 170.

The APBL interface 120 is used to access internal registers of the read channel circuitry 110. Depending on the storage system architecture, a controller (e.g., on-chip controller, off-chip controller, or remote controller that is external to the storage device 10) can be connected to the read channel circuitry 110 via the APBL interface 120, as necessary, to access internal registers and program the read channel circuitry 110.

The preamplifier circuitry 130 is connected between the read channel circuitry 110 and the magnetic read/write head 180. In one embodiment, the preamplifier circuitry 130 is disposed proximate to a pivot location of the actuator motor 190. Thin printed-circuit cables are used to connect the magnetic read/write head 180 to the preamplifier circuitry 130.

The preamplifier circuitry 130 amplifies an analog signal output from the magnetic read/write head 180 for input to the read channel circuitry 110 and provides a bias voltage for magnetic sensors of the magnetic read/write head 180.

The motor controller 106 is connected to the head/disk assembly 150 via the servo interface 118. The motor controller 106 sends control signals to the spindle motor 160 and actuator motor 190 through the servo interface 118 during read and write operations to spin the storage disk 170 and move the magnetic read/write head 180 into a target position. In particular, for a typical read operation, signals for performing a read operation are received through the host interface connector 114 and sent to the hard disk controller 102 through the host interface controller 104. The hard disk controller 102 processes the read signals for performing the read operation and then sends control signals to the motor controller 106 for controlling the actuator motor 190 and spindle motor 160 for the read operation. Additionally, the hard disk controller 102 sends the processed read signals to the read channel circuitry 110, which are then sent to the actuator motor 190 through the preamplifier circuitry 130 to perform the read operation. The actuator motor 190 positions the magnetic read/write head 180 over a target data track on storage disk 170 in response to control signals received by the motor controller 106 and the read channel circuitry 110. The motor controller 106 also generates control signals to drive the spindle motor 160 to spin the storage disk 170 under the direction of the hard disk controller 102. The spindle motor 160 spins the storage disk 170 at a determined spin rate.

When the magnetic read/write head 180 is positioned adjacent a target data track, magnetic signals representing data on the storage disk 170 are sensed by magnetic read/write head 180 as the storage disk 170 is rotated by the spindle motor 160. The sensed magnetic signals are provided as continuous, minute analog signals representative of the magnetic data on the storage disk 170. The analog signals are transferred from the magnetic read/write head 180 to the read channel circuitry 110 via the preamplifier circuitry 130. The preamplifier circuitry 130 amplifies the analog signals accessed from storage disk 170, and the read channel circuitry 110 decodes and digitizes the received analog signals to recreate the information originally written to the storage disk 170. The data read from the storage disk 170 is then output to a host system or device through the host interface controller 104 and host interface connector 114 under control of the hard disk controller 102.

A write operation is substantially the opposite of a read operation. For example, in one embodiment, write signals for performing write operations are received through the host interface connector 114, wherein the write signals represent commands to perform a write operation and/or data that is to be written to the storage disk 170. The write signals are sent to the hard disk controller 102 through host interface controller 104. The hard disk controller 102 processes the write signals for performing the write operation and then sends control signals to the motor controller 106 for controlling the actuator motor 190 and spindle motor 160 for the write operation. Additionally, the hard disk controller 102 sends the processed write signals (and formatted data) to the read channel circuitry 110, wherein the formatted data to be written is encoded. The write signals (control and data) are then sent to the actuator motor 190 through the preamplifier circuitry 130 to perform a write operation by writing data to the storage disk 170 via the magnetic read/write head 180.

In the embodiment of FIG. 1, the external random access memory 140 is an external memory relative to the system-on-chip 100 and other components of the storage device 10, but is nonetheless internal to the storage device 10. In one embodiment, the external random access memory 140 is a double data rate synchronous dynamic random access memory, although a wide variety of other types of memory may be used in alternate embodiments. The external random access memory 140 is initialized by the memory controller 108. The memory controller 108 performs signaling control of the external random access memory 140 on behalf of the hard disk controller 102, whereby initialization of the external random access memory 140 is implemented via the programming of configuration registers in the memory controller 108 by the disk controller 102. In operation, the memory controller 108 generates internal clock pulses for synchronizing data write operations and read operations of the external random access memory 140. The internal clock signals and data are transmitted to and from the external random access memory 140 via the memory interface 116 (which is a data/signal bus).

In one embodiment of the invention, the external random access memory 140 serves as a buffer memory for data transfers between a host system/device and the storage device 10. For example, the read and or write signals (as discussed above) that are received by the hard disk controller 102 from the host interface controller 104 can be temporarily stored in the external random access memory 140 before being processed by the hard disk controller 102 and the read channel circuitry 110, for example. Moreover, data that is read out from the storage disk 170 may be temporarily stored in the external random access memory 140 before being packaged and output to a host system/device by operation of the hard disk controller 102 and the host interface controller 104. This buffering optimizes the throughput of the storage device 10 by matching disparate processing and data transmission speeds as data passes to and from the storage disk 170.

The buffer memory 112 comprises on-chip memory that is used by the hard disk controller 102 to temporarily store data and/or instructions for performing read/write operations. In one embodiment of the invention, the internal buffer memory 112 is used by the system-on-chip 100 as a buffer memory for normal functional mode operations. In one embodiment of the invention, the internal memory buffer 112 is used as a LLI (Long Latency Interface) buffer memory for normal functional mode operations of the system-on-chip 100.

It is to be understood that the external random access memory 140, system-on-chip 100 and preamplifier circuitry 130 shown in FIG. 1 collectively represent one embodiment of "control circuitry" as that term is utilized herein. Numerous alternative embodiments of "control circuitry" include a subset of the components 100, 130 and 140 or portions of one or more of these components. For example, the system-on-chip 100 itself may be viewed as an example of "control circuitry" to process data received from and supplied to the magnetic read/write head 180 and to control positioning of the magnetic read/write head 180 relative to the storage disk 180. Certain operations of the system-on-chip 100 in the storage device 10 of FIG. 1 may be directed by the hard disk controller 102, which executes code stored in the external random access memory 140 and/or the internal buffer memory 112, for example. Thus, at least a portion of the control functionality of the storage device 10 may be implemented at least in part in the form of software code.

Furthermore, although the embodiment of FIG. 1 illustrates various components of the system-on-chip 100 being implemented on a single integrated circuit chip, the system-on-chip 100 may include other integrated circuits, such as the external random access memory 140 or the preamplifier circuitry 130, or portions thereof. Moreover, the hard disk controller 102, host interface controller 104, and motor controller 106, may be implemented using suitable integrated circuit architectures such as microprocessor, digital signal processor (DSP), application-specific integrated circuit (ASIC), or field-programmable gate array (FPGA), or other types of integrated circuit architectures.

While FIG. 1 shows an embodiment of the invention with one instance of each of the single storage disk 170, magnetic read/write head 180, and positioning arm 185, in an alternate embodiment of the invention, the storage device 10 comprises multiple instances of one or more of these or other drive components. For example, in an alternative embodiment of the invention, the storage device 10 comprises multiple storage disks attached to the same spindle such that each storage disk rotates at the same speed, as well as multiple magnetic read/write heads and associated positioning arms coupled to one or more actuators. Moreover, it is to be understood that a read/write head as that term is broadly used herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads. Such heads may comprise, for example, write heads with wrap-around or side-shielded main poles, or any other types of heads suitable for recording and/or reading data on a storage disk.

In addition, the storage device 10 as illustrated in FIG. 1 may include other elements in addition to, or in place of those specifically shown, including one or more elements of a type commonly found in conventional storage devices. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

As noted above, the read channel circuitry 110 comprises sync mark detection circuitry 200 for detecting synchronization marks (or other information patterns) in read back signals that are generated by reading stored data from the storage disk 170. In one embodiment of the invention, a synchronization mark detection scheme is implemented for a TDMR system, wherein at least two read heads are used to read data from the same track with a predetermined read offset. While the read back signals obtained from the different read heads include the same read data, these read back signals can have different noise levels/components such that individual detection of a synchronization mark (or other information pattern) in each stream can result in poor detection when one of the read heads has low signal quality. To improve the detection of synchronization marks in read back signals, a combined synchronization mark detection scheme is implemented.

For example, in one embodiment, when two read head are used, a first metric is computed by comparing a first read back sample stream to a reference pattern representative of a synchronization pattern to be detected, and a second metric is computed by comparing a second read back sample stream to the reference pattern. A combined metric is computed by combining the first metric and second metric according to a certain combination ratio that is based on a weighting function. In one embodiment, an optimal combination ratio for combining the metrics of the different read back sample streams is determined dynamically, in real time or near real time, using SNR (signal-to-noise ratio) metrics that are determined for the different sample streams based on uncorrelated noise assumptions. In another embodiment, an optimal combination ratio for combining the metrics of the different read back sample streams is determined/accessed using a look-up table scheme, which provides a practical system design to account for correlated noise between the different read back sample streams. Embodiments of combined pattern detection schemes will now be discussed in further detail with reference to FIGS. 2, 3, and 4, for example.

Figure 2:
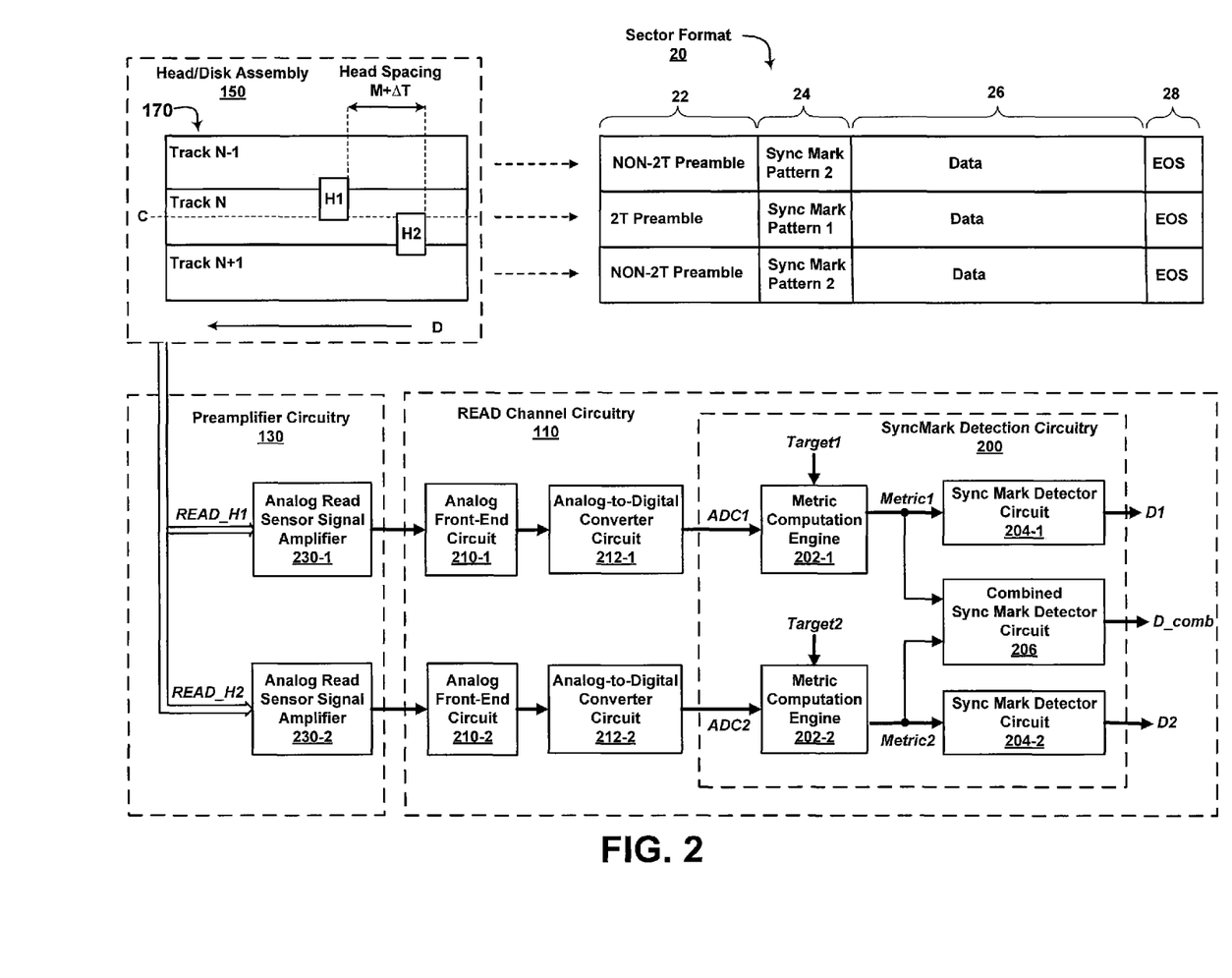
FIG. 2 schematically illustrates a more detailed embodiment of the storage device of FIG. 1, which comprises detection circuitry to detect synchronization marks in a read channel of the storage device, according to an embodiment of the invention.

FIG. 2 schematically illustrates a more detailed embodiment of the storage device of FIG. 1, which comprises detection circuitry to detect synchronization marks in a read channel of the storage device, according to an embodiment of the invention. More specifically, FIG. 2 illustrates details of various components of the head/disk assembly 150, the preamplifier circuitry 130, the read channel circuitry 110, and the sync mark detection circuitry 200 of the storage device 100 of FIG. 1, which are used to implement a combined synchronization mark detection scheme, according to an embodiment of the invention. The head/disk assembly 150 shown in FIG. 2 illustrates a portion of the storage disk 170 and a first read head H1 and a second read head H1 that are included in the magnetic read/write head 180 of FIG. 1. The preamplifier circuitry 130 comprises a first analog read sensor signal amplifier 230-1, and a second analog read sensor signal amplifier 230-2. The read channel circuitry 110 comprises a first analog front-end circuit 210-1, a second analog front-end circuit 210-2, a first analog-to-digital converter circuit 212-1, and a second analog-to-digital converter circuit 212-2. The sync mark detection circuitry 200 comprises a first metric computation engine 202-1, a second metric computation engine 202-2, a first sync mark detector circuit 204-1, a second sync mark detector circuit 204-2, and a combined sync mark detector circuit 206.

As discussed above, the storage disk 170 comprises data that is stored in a plurality of concentric tracks around the magnetic recording surface of the storage disk 170, wherein each track is divided into a number of addressable sectors. For illustrative purposes, FIG. 2 shows a portion of three adjacent concentric tracks, e.g., Track N−1, Track N, Track N+1, as well as a sector format 20 for each of the tracks Track N−1, Track N, Track N+1. In particular, as shown in FIG. 2, the sector format 20 of each track generally comprises a preamble block 22, a sync mark block 24, a data block 26, and an EOS (end of segment) block 28.

In a given sector, the preamble block 22 comprises a long bit pattern (e.g., 120 bits) that enables the read channel to calibrate gain and establish proper timing and bit synchronization. The preamble block 22 may comprise a 2 T pattern or a 4 T pattern, for example, wherein T denotes one clock cycle of the read channel. The preamble block 22 comprises a bit pattern that simulates a sinusoidal read signal that is generated by reading the bit pattern of the preamble block 22. For a 2 T preamble block, the preamble may comprise a repeating "1100" bit pattern. In the embodiment shown in FIG. 2, the preamble blocks 22 of adjacent tracks include different patterns, e.g., Track N includes a 2 T preamble whereas the adjacent tracks Track N−1 and Track N+1 comprise a non-2 T preamble pattern (e.g., a 3 T or 4 T pattern, for example).

Furthermore, in a given sector, the sync mark block 24 follows the preamble block 22 to mark the beginning of the user data block 26. In general, the sync mark block 24 comprises a predetermined bit pattern that is detected to determine a beginning of the data block 26 that follows the sync mark block 24. The sync mark block 24 includes a predetermined pattern of bits (e.g., 20 bits) that is detected (using detection techniques discussed herein) to identify a starting bit of the following data block 26. In the embodiment shown in FIG. 2, the sync mark blocks 24 of adjacent tracks include different sync mark patterns that correspond to the preamble patterns used in the given sector, e.g., the sync mark block 24 of Track N includes a first pattern (sync mark pattern 1), whereas the sync mark blocks 24 of adjacent tracks Track N−1 and Track N+1 comprise a second pattern (sync mark pattern 2). The data block 26 of a given sector includes data that is encoded using well-known techniques (e.g., run length encoding, etc.). The EOS block 28 of a given sector comprises a bit pattern that marks the end of the data block 26 of the given sector, and perhaps the beginning of a new sector or a block of servo data.

As used herein, the phrase "synchronization mark" or "sync mark" is used in its broadest sense to mean any pattern that may be used to establish a point of reference. Thus, for example, a sync mark may be user sync mark as is known in the art, or one or more portions of servo data bit patterns, or other types of marks that establish a point of reference in a read back signal stream in a read channel. Based upon the disclosure provided herein, one of ordinary skill in the art may recognize other sync marks that could be used in relation to different embodiments of the present invention.

The embodiment of FIG. 2 illustrates a TDMR storage system in which the first and second read heads H1 and H2 of the magnetic read/write head 180 (FIG. 1) are positioned to read the same track (e.g., Track N) at a different read offset (M+$\Delta$T) along a centerline C of the given track. In particular, assuming that the storage disk 170 moves in the direction D as indicted by the arrow in FIG. 2, then a given location on the track N will be initially read by the second read head H2, and then the same location will be subsequently read by the first read head H1. In this regard, because of the physical separation between the read heads H1 and H2 along the direction D of movement of the track, there will be a read offset (M+$\Delta$T) between the read back signals that are output from the read heads H1 and H2, wherein M represents an integer number of bits positions in which the different read signals from H1 and H2 are offset, and wherein $\Delta$T denotes a fractional number a bit position in which the different read signals from H1 and H2 are offset.

As explained in further detail below, the integer number M of offset bit positions can be adjusted using alignment circuitry in one of the read channel decoding paths to align the two read streams. The fractional value $\Delta$T of bit position offset can be adjusted using other delay techniques within one of the read channel decoding paths (e.g., within equalization or analog to digital circuitry). The value of the read offset(M+$\Delta$T) between the read back signals that are output from the first and second read heads H1 and H2 can be calibrated and determined during manufacturing. FIG. 2 further depicts that the first and second read heads H1 and H2 are "vertically" offset across the given track Track N (i.e., offset across the track with regard to the centerline C of the track), such that first and second read heads H1 and H2 primarily cover different regions of the given track, and such that the first and second read heads H1 and H2 overlap portions of adjacent tracks Track N−1 and Track N+1, respectively. This "vertical" offset is the result of physical limitations in manufacturing and/or the result of specific designs implementations. Such "vertical" offset provides an advantage with regard to read channel decoding techniques that utilize signal diversity to reduce bit error rates (BER), as is readily understood by one of ordinary skill in the art. Although two read heads H1 and H2 are shown, alternate embodiments of the invention may be implemented with three or more read heads to read the same track and/or different tracks at the same time.

In the example TDMR storage device embodiment of FIG. 2, two parallel processing channels are utilized for processing respective read signals, READ_H1 and READ_H2, which are output from the respective read heads H1 and H2, to perform synchronization mark detection techniques according to embodiments of the invention. A first processing channel includes the circuit blocks 230-1, 210-1, 212-1, 202-1 and 204-1, which are used to process the read signal READ_H1, detect a synchronization mark (or some other desired information pattern) in the read signal READ_H1, and output synchronization mark detection results D1 for the first processing channel. Further, a second processing channel includes the circuit blocks 230-2, 210-2, 212-2, 202-2 and 204-2, which are used to process the read signal READ_H2, detect a synchronization mark (or some other desired information pattern) in the read signal READ_H2, and output synchronization mark detection results D2 associated with the second processing channel.

Moreover, as explained in further detail below, the combined sync mark detector circuit 206 utilizes decoded information from both processing channels to perform synchronization mark detection, wherein first and second metrics Metric1 and Metric2 computed in the first and second processing channels are combined according to certain ratios or weights to detect a synchronization pattern and output combined synchronization mark detection results D_comb. As explained in further detail below, any combination of the detection results D1, D2 and/or D_comb, can be used as the final detection results and/or to verify the detection results.

In the first and second processing channels, the analog read sensor signal amplifiers 230-1 and 230-2 amplify the read signals READ_H1 and READ_H2, respectively. The read signals READ_H1 and READ_H2 are essentially analog signals that are generated and output from the respective magnetic read heads H1 and H2, when performing a read operation to read data at a target location on a track of the storage disk 170. The analog front-end circuits 210-1 and 210-2 comprise various types of circuit blocks that are typically included in front-end circuitry of read channels. Such circuit blocks in include, for example, a variable gain amplifier (VGA), and a continuous time filter. A VGA adjusts the amplitude of the analog read signal to a value that is suitable for a dynamic range of the downstream analog-to-digital converter circuitry 212-1 and 212-2. A continuous time filter, is a pulse-shaping filter, which serves to filter the gain-adjusted analog read signal for anti-aliasing purpose and provide a proper high frequency boost, and output a filtered analog read signal. In one embodiment, a continuous time filter is a low-pass filter that filters the analog read signal before it is sampled to reduce the effects of aliasing. In short, the VGA and continuous time filter process the analog waveform to a desired pulse amplitude and bandwidth for conversion to a digital signal.

The analog-to-digital converter circuit 212-1 receives an amplified/filtered version of the analog read signal READ_H1 from the analog front-end circuit 210-1, and samples the signal in response to a sample clock to convert the amplified/filtered version of the analog read signal READ_H1 into a first sample stream ADC1. Similarly, the analog-to-digital converter circuit 212-2 receives an amplified/filtered version of the analog read signal READ_H2 from the analog front-end circuit 210-2, and samples the signal in response to a sample clock to convert the amplified/filtered version of the analog read signal READ_H2 into a second sample stream ADC2. The first and second sample streams ADC1 and ADC2 are time-sequenced digital signals comprising samples of the respective analog read signals READ_H1 and READ_H2. In one embodiment of the invention, the analog-to-digital converter circuits 212-1 and 212-2 are configured to have programmable sampling phases that can be selected based on the equalization targets of the equalization filters that are used in the read channel for data sequence detection.

By way of example, although not specifically shown in FIG. 2, in an alternative embodiment of the invention, the first and second sample streams ADC1 and ADC2 are input to respective equalization filters within the separate processing channels, which serve to equalize the sample streams ADC1 and ADC2 to a specified partial response target (e.g., PR4, EPR4, $E^2$PR4, etc.) that represents or approximates a frequency response of the read back signal of the data that is stored on the storage disk 170. For example, in one embodiment, the equalization filters are digital finite impulse response filters that are configured so that a spectrum of the equalization filter output has a shape that is similar to that of the frequency response of the partial response target. In other embodiments of the invention, other known types of equalization circuits and methods can be implemented instead of or in combination with digital finite impulse response filters to equalize the sample stream.

The first metric computation engine 202-1 receives the first sample stream ADC1 and a first reference pattern Target1 and computes a first metric Metric1 by comparing the first sample stream ADC1 to the reference pattern Target1, wherein Target1 is representative of a target information pattern to be detected. Similarly, the second metric computation engine 202-2 receives the second sample stream ADC2 and a second reference pattern Target2 and computes a second metric Metric2 by comparing the second sample stream ADC2 to the reference pattern Target2, wherein Target2 is representative of the target information pattern to be detected. In general, in one embodiment of the invention, the first and second metrics Metric1 and Metric2 comprises distance metrics that are computed by determining a difference between portions of the first and second sample streams ADC1 and ADC2 to respective reference patterns Target1 and Target2. For example, in one embodiment of the invention, assuming the synchronization mark (or other target information pattern) to be detected is a 20 bit pattern, the reference patterns Target1 and Target2 would be 20 bit patterns that are the same as the pattern of the synchronization mark to be detected. Depending on the implementation (e.g., distance computation process) that is used to compute the distance metrics, the reference patterns Target1 and Target2 can be the same or similar to each other, or different. Moreover, depending on the implementation, the reference patterns Target1 and Target2 can be the same or similar to the synchronization mark to be detected, or different. Example embodiments of method that may be implemented in the first and second metric computation engines 202-1 and 202-2 will be discussed in further detail below.

The first and second sync mark detector circuits 204-1 and 204-2 receive as input the first and second metrics Metric1 and Metric2, and output respective detection results D1 and D2. The detection results D1 and D2 indicate those portions the respective first and second sample streams ADC1 and ADC2 where the synchronization mark is detected. In this embodiment, the first and second sync mark detector circuits 204-1 and 204-2 perform the same or similar detection process to independently detect the synchronization mark in the respective first and second sample streams ADC1 and ADC2. In one embodiment, the first and second sync mark detector circuits 204-1 and 204-2 implement methods to detect synchronization marks by comparing values of the first and second metrics Metric1 and Metric2 to threshold values, and then determining that a synchronization mark pattern is detected based at least in part on the comparison between the values of the first and second metrics Metric1 and Metric2 and the threshold values. The first and second sync mark detector circuits 204-1 and 204-2 can implement various detection techniques that are known to those of ordinary skill in the art.

In addition to independently detecting the synchronization mark in each of the first and second processing channels, the combined sync mark detector circuit 206 receives the first and second metrics Metric1 and Metric2 and computes a combined metric Metric by combining the first metric and second metric Metric1 and Metric2 using a weighting function. The combined metric Metric is then used to detect a target synchronization mark and output a detection result D_comb that indicates the location of the synchronization pattern in the read back signals based on the combined metric. An example embodiment of the combined sync mark detector circuit 206 will be discussed with reference to FIG. 3.

Figure 3:
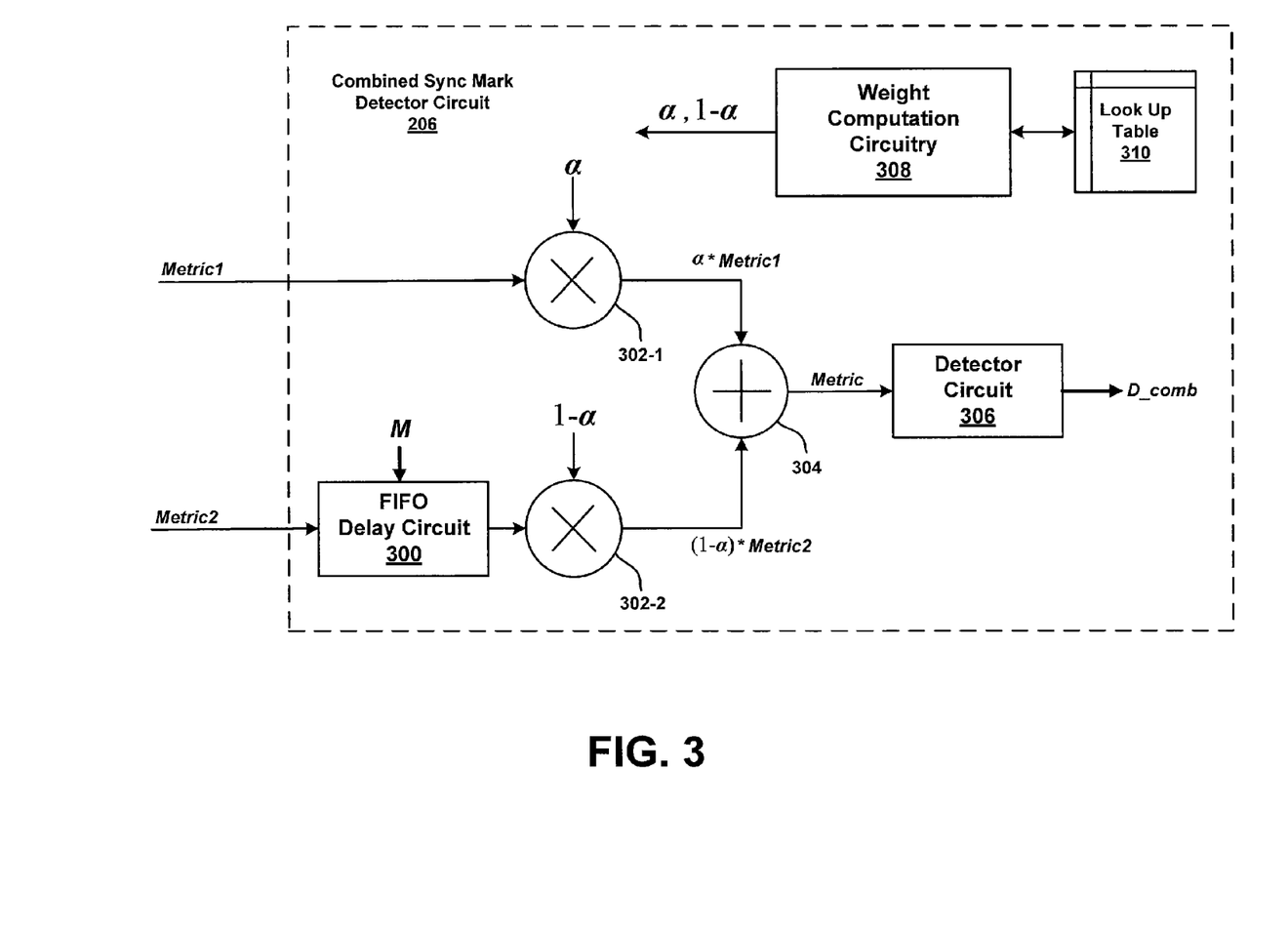
FIG. 3 is a block diagram of a circuit to detect synchronization marks using combined metrics, which is used to implement the detection circuitry shown in FIG. 2, according to an embodiment of the invention.

In general, FIG. 3 illustrates a block diagram of a circuit to detect synchronization marks using combined metrics, according to an embodiment of the invention. FIG. 3 illustrates an embodiment of the combined sync mark detector circuit 206 of FIG. 2, which comprises a FIFO delay circuit 300, a first multiplication circuit 302-1, a second multiplication circuit 302-2, an adder circuit 304, a detector circuit 306, weight computation circuitry 308, and a look-up table 310. As depicted in FIG. 3, the combined sync mark detector circuit 206 receives as input the first and second metrics Metric1 and Metric2, wherein the first metric Metric1 is applied to the first multiplication circuit 302-1 and the second metric Metric2 is applied to the FIFO delay circuit 300. The FIFO delay circuit 300 serves to align bit positions of the second metric Metric2 associated with the second sample stream ADC2 to corresponding bit positions of the first metric Metric1 associated with the first sample stream ADC1.

In one embodiment, the FIFO delay circuit 300 is a programmable delay circuit wherein a parameter M is input to set the delay of the FIFO delay circuit 300. As discussed above, the value M denotes an integer delay (e.g., integer number of bit positions) in which the first read sensor H1 lags behind the second read sensor H2 (FIG. 2) based on the physical separation (head spacing) of the first and second read sensors H1 and H2 along a direction of movement of a given track. In one embodiment of the invention, the FIFO delay value M is determined during a calibration stage at time of manufacturing, as follows.

Initially, the FIFO delay value M is set to M=0. Then, a given set of sector data comprising a synchronization mark is read using the first and second read heads H1 and H2, and the sector data is processed using the first and second parallel processing channels as discussed above to independently determine the location of the synchronization mark, and output the detection results D1 and D2. Once D1 and D2 are determined, the difference between the D1 and D2 detection is used to determine the time delay between the signal acquisition, and this time delay is used to determine the head spacing in terms of an integer number of bit positions M between the first and second sample streams ADC1 and ADC2. The parameter M is then used to program the FIFO delay circuit 300 using techniques known to those of ordinary skill in the art. Moreover, the non-integer portion (i.e., ΔT in FIG. 2), which is less than on bit portion, can be compensated for in the second processing channel using known techniques.

Referring again to FIG. 3, the first metric Metric1 is input to the first multiplication circuit 302-1, wherein a first weight a is applied to the first metric Metric1 to generate a first weighted metric α*Metric1. Similarly, the second metric Metric2 (which is output from the FIFO delay circuit 300 in alignment with the first metric Metric1) is input to the second multiplication circuit 302-2, wherein a second a second weight (1−α) is applied to the second metric Metric2 to generate a second weighted metric (1α)*Metric2. The aligned first and second weighted metrics are added together by the adder circuitry 304 to generate a combined metric Metric as follows:

$$\text{Metric} = \alpha * \text{Metric1} + (1-\alpha) * \text{Metric2} \qquad \text{Eqn. (1)}$$

The detector circuit 306 receives as input the combined metric Metric and outputs the detection result D_comb. The combined detection result D_comb indicates a portion the first sample stream ADC1 and/or the second sample stream ADC2 where the synchronization mark is located. In this embodiment, the detector circuit 306 performs the same or similar detection process as the first and second sync mark detector circuits 204-1 and 204-2 as discussed above. For example, in one embodiment, the detector circuit 306 compares values of the combined metric Metric to a threshold value, and then determines that a synchronization mark pattern is detected based at least in part on the comparison between the values of the combined metric Metric and the threshold value.

The weight computation circuitry 308 implements methods to dynamically compute (in real time, or near real time) or otherwise access predetermined values of the different weights, e.g., first weight a and second weight (1−α), which are applied to the multiplication circuits 302-1 and 302-2. For example, as explained in further detail below, in one embodiment, the weight computation circuitry 308 dynamically determines the first weight a as a function of a variance of the first metric Metric1 and a variance of the second metric Metric2. In another embodiment, the weight computation circuitry 308 determines the first weight a as a function of a first signal-to-noise ratio SNR1 of at least a portion of the first sample stream ADC1, and a second signal-to-noise ratio SNR2 of at least a portion of the second sample stream ADC2.

In another embodiment, the weight computation circuitry 308 can access a value of the first weight a from the look-up table 310, wherein the lookup table 310 comprises a plurality of first weight values that are each indexed by at least a first predefined signal-to-noise ratio value SNR1 and a second predefined signal-to-noise ratio value SNR2 according to the look-up function α=LUT(SNR1, SNR2). For example, the weight computation circuitry 308 will determine a first signal-to-noise ratio value SNR1 of at least a portion of the first sample stream ADC1, determine a second signal-to-noise ratio value SNR2 of at least a portion of the second sample stream ADC2, and use the first and second signal-to-noise ratio values SNR1 and SNR2 to access a value of the first weight a from the lookup table 310.

Figure 4:
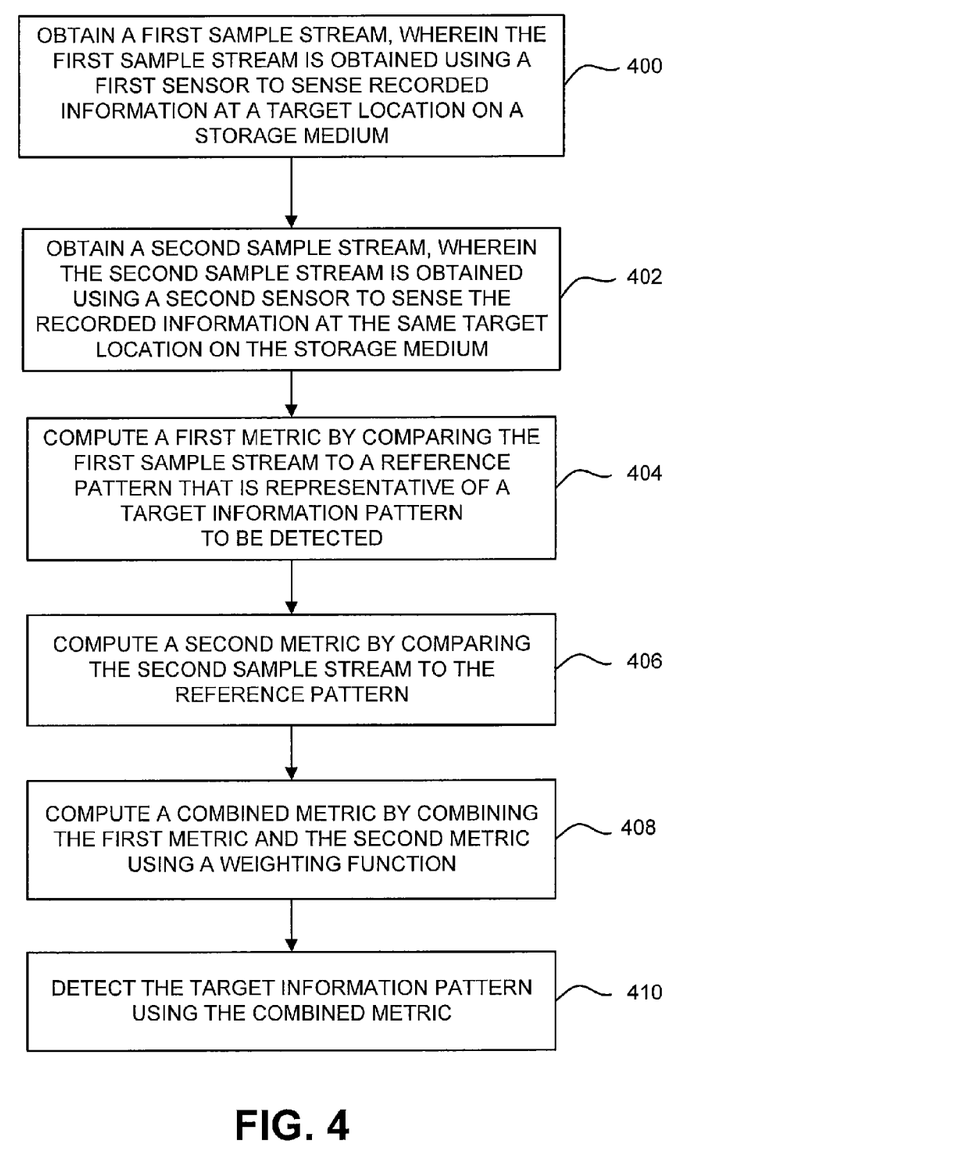
FIG. 4 is a flow diagram of a method for detecting information patterns, such as synchronization marks, according to an embodiment of the invention.

FIG. 4 illustrates a method for detecting an information pattern in a read channel of a storage device, according to an embodiment of the invention. In one embodiment of the invention, FIG. 4 illustrates a method that is implemented by the sync mark detector circuit 200 according to an embodiment of the invention and, therefore, for purposes of illustration, the method of FIG. 4 will be discussed with reference to the sync mark detection circuit framework shown in FIGS. 2 and 3, for example.

Referring to FIG. 4, initial steps include obtaining a first sample stream, wherein the first sample stream is obtained by sensing recorded information at a target location of a storage medium using a first sensor (block 400), and obtaining a second sample stream, wherein the second sample stream is obtained by sensing recorded information at the same target location of the storage medium using a second sensor (block 402). As discussed above with reference to FIG. 2, the first and second read heads H1 and H2 sense the same data block (e.g., sector data block) on a given track of the storage medium 170, and output first and second read signals READ_H1 and READ_H2 to respective processing channels, wherein first and second read signals READ_H1 and READ_H2 are processed by preamplifier circuitry 130 and the analog-front end circuits 210-1 and 210-2. The first and second sample streams ADC1 and ADC2 are generated by the analog-to-digital converter circuits 212-1 and 212-2 converting the first and second read signals READ_H1 and READ_H2 into time-sequenced digital sample streams using well-known analog-to-digital conversion circuitry and methods.

The next steps in the exemplary method comprise computing a first metric by comparing the first sample stream to a reference pattern representative of a target information pattern to be detected (block 404) and computing a second metric by comparing the second sample stream to the reference pattern (block 406). For example, as discussed above with reference to FIG. 2, these steps are implemented by the first and second metric computation engines 202-1 and 202-2, which compute the first and second metrics Metric1 and Metric2 by iteratively comparing portions of the first and second sample streams ADC1 and ADC2 to reference patterns Target1 and Target2 and computing distance measures. In one embodiment of the invention, the first and second metric computation engines 202-1 and 202-2 implement metric computation techniques as disclosed in U.S. Pat. No. 8,614,858 to Yang, et al., entitled "*Systems and Methods For Sync Mark Detection Metric Computation*," which is commonly assigned and fully incorporated herein by reference.

Briefly, U.S. Pat. No. 8,614,858 discloses systems and methods that utilize a noise whitened distance measurement to yield a comparison value. The magnitude of the comparison value corresponds to whether a reference pattern has been detected or not. This approach considers noise correlation between proximate bit positions, wherein noise cancellation is applied using a noise whitening filter. More specifically, in one embodiment, a metric computation process (as disclosed in U.S. Pat. No. 8,614,858) is performed by the metric computation engines 202-1 and 202-2 as follows. The metric computation engine (e.g., engine 202-1) receives a sample stream (e.g., ADC1, or an equalized ADC1 stream) and, for each bit position of the reference pattern (e.g., Target1), computes a difference between the reference pattern and a corresponding sample of the sample stream (or equalized sample stream). For example, the difference computation may be performed as:

$$\text{Difference}_x = \text{Sample\_Stream}_x - \text{Reference\_Pattern}_x$$

wherein x indicates a given bit position. Then, noise whitening filtering is applied to a set of difference values to yield a set of noise whitened outputs, wherein noise whitening filtering may be performed as follows:

$$\text{Noise\_Whitened\_Output}_i = \sum_{k=0}^{m} f_k(\text{Difference}_{i-k})$$

where k indicates a given one of noise whitening filter taps (e.g., $f_k$), where (i−k) indicates a given bit position, and where i represents a noise whitened output for a given bit position. The filter taps may be pattern dependent (e.g., tuned for a specific sync mark pattern or the like). In such a case, an index i could represent a bit position and the filter taps for each i may correspond to bit positions, i, i−1, i−2, i−3 . . . i−x. Each of the noise whitened outputs are squared to yield a squared output, wherein such squaring may be performed as follows:

$$\text{Squared\_Output}_i = (\text{Noise\_Whitened\_Output}_i)^2.$$

Each of the squared outputs corresponding to the bit positions of reference pattern (e.g., Target1) are summed to yield a comparison value (e.g. Metric1) as follows:

$$\text{Comparison\_Value} = \sum_{i=0}^{l} \text{Squared\_Output}_i$$

where l corresponds to the number of bit positions in the reference pattern.

In the embodiment of FIG. 2, the sync mark detector circuits 204-1 and 204-2 receive the respective comparison values (Metric1 and Metric2) and compare such comparison values with a threshold value. Where the comparison value is less than the threshold value, a synchronization pattern is determined as being detected, and the respective detection results D1 and D2 are separately output to indicate a location of the detected synchronization mark in the read back signals of the separate processing channels.

Referring again to FIG. 4, the next steps include computing a combined metric by combining the first metric and second metric using a weighting function (block 408), and then detecting the target information pattern using the combined metric (block 410). By way of specific example, in one embodiment of the invention, the process implemented in bock 408 (FIG. 4) is performed by the various component 300, 302-1, 302-2, 304, 308 and 310 of the combined sync mark detector circuit 206 shown in FIG. 3. As the distance metrics Metric1 and Metric2 are computed and output from the first and second metric computation engines 202-1 and 202-3, the sample streams associated with the first and second metrics Metric1 and Metric2 are aligned by applying the second metric stream Metric2 to the FIFO delay circuit 300. As noted above, the programmatic value M is determined from calibration. When M is known, the FIFO delay is implemented as mod(M,4) or mod(M,6), for example, depending on whether the sector preamble format is 2 T or 3 T, for example.

Moreover, as noted above, in one embodiment of the invention, a combined metric Metric is determined by combining the first and second metrics using a weighting function such as [α*Metric1+(1−α)*Metric2], wherein the weights (or combination ratios) that are applied to the first and second metrics Metric1 and Metric2 by the respective multiplication circuits 302-1 and 302-2 (FIG. 3) are computed or otherwise determined by the weight computation circuitry 308 using various methods.

For example, in one embodiment of the invention, the weights can be dynamically computed during real-time operation based on computed variance values and/or signal-to-noise ratio values as follows. In the example embodiment of FIGS. 2 and 3 with two read heads and two processing channels, the variance of the combined metric Metric is computed as:

$$\text{Var}(\text{Metric})^2 = \alpha^2 \text{Var}(\text{Metric1})^2 + (1-\alpha)^2 \text{Var}(\text{Metric2})^2 + 2\alpha(1-\alpha)E[(\text{Metric1}-E[\text{Metric1}])(\text{Metric2}-E[\text{Metric2}])] \qquad \text{Eqn. (2)}$$

wherein E denotes an "expected" value, as that term is understood in probability theory. Further, assuming that noise in the first and second sample streams ADC 1 and ADC2 is uncorrelated, then the above equation Eqn. (2) can be simplified as:

$$\mathrm{Var}(Metric)^2 = \alpha^2 \mathrm{Var}(Metric1)^2 + (1-\alpha)^2 \mathrm{Var}(Metric2)^2 \quad \text{Eqn. (3)}$$

To minimize the variance of the combined metric, based on the equation Eqn. (3), an optimal value for the weight a can be computed as:

$$\alpha \sqrt{\frac{\mathrm{Var}(Metric2)^2}{\mathrm{Var}(Metric1)^2 + \mathrm{Var}(Metric2)^2}} \quad \text{Eqn. (4)}$$

In one embodiment of the invention, the weight computation circuitry 308 can use the stream of first and second metrics Metric1 and Metric2 for a currently read sector (or for a previously read sector on the same track) to dynamically compute the first weight a as a function of a variance of the first metric Metric1 and a variance of the second metric Metric2 based on the above equation Eqn. (4).

In another embodiment of the invention, assuming that a mean value of the first and second metric Metric1 and Metric2 are the same, an optimal value for the weight a can be computed as:

$$\alpha = \sqrt{\frac{1/SNR2}{1/SNR1 + 1/SNR2}} = \sqrt{\frac{SNR1}{SNR1 + SNR2}} \quad \text{Eqn. (5)}$$

Accordingly, in an alternate embodiment of the invention, based on the above equation Eqn. (5), during real-time operation, the weight computation circuitry 308 can dynamically compute the first weight a as a function of a first signal-to-noise ratio SNR1 of at least a portion of a first sample stream obtained by reading sector data with the first read head H1, and a second signal-to-noise ratio SNR2 of at least a portion of a second sample stream obtained by reading the same sector data with the second read head H2. After computing the first weight a using the above equation Eqn. (5), the second weight can be computed as $(1-\alpha)$.

In one embodiment of the invention, the first and second signal-to-noise ratio values SNR1 and SNR2 can be computed from the same preamble signal of a given sector that is read by the first and second read heads H1 and H2. The preamble signal which is used to compute the first and second signal-to-noise ratio values SNR1 and SNR2 can be a preamble signal that is associated with a currently read sector, or a previously read sector on the same track of the storage medium (e.g., a given track can have 100 or more sectors). In this regard, the first and second signal-to-noise ratio values SNR1 and SNR2 can be computed from the preamble signal in each set of sector data that is read, to thereby determine the scaling ratios for combining the first and second metrics to detect the synchronization mark for each set of sector data. Alternatively, the first and second signal-to-noise ratio values SNR1 and SNR2 can be computed using the preamble signal of given set of sector data, wherein these values SNR2 and SNR2 are used to determine the a scaling ratio for combining the first and second metrics in the given set of sector data and additional sets of sector data on the same track.

In an alternate embodiment of the invention, the first and second signal-to-noise ratio values SNR1 and SNR2 (which are used in the above equation Eqn. (5)) can be computed from an equalization stage (e.g., digital finite impulse response filter) in which samples of a data block within a given sector are equalized. In this embodiment, the first and second signal-to-noise ratio values SNR1 and SNR2, which are computed during equalization of the sample stream of the data block portion of a given sector, can be used to determine the scaling ratios for combining the first and second metrics to detect synchronization marks for one or more subsequent sets of sector data within the same track.

In yet another embodiment of the invention, to reduce computation expense and implement a practical system with correlated noise, as discussed above, a look-up table scheme is implemented, in which a plurality of values for the weight a are each indexed by pairs of SNR1 and SNR2 values, and accessed from the look-up table 310 by the weight computation circuitry 308 according to the following function: $\alpha = \mathrm{LUT}(SNR1, SNR2)$. In this embodiment, the look-up table 310 can be populated with the values of $\alpha$, SNR1, and SNR2 during a calibration stage of manufacturing based on actual measurements or theoretical optimal values as discussed above with reference to equations Eqn. (2)-(5). During run-time operation, the SNR1 and SNR2 values can be computed based on signal-to-noise ratio estimations obtained when processing sector preamble signals or equalizing data samples, for example. In another embodiment, the values of the look-up table 310 can be dynamically optimized and updated from data obtained during run-time operations and/or practical system simulations.

In one embodiment of the process flow of FIG. 4, the step of detecting the target information pattern using the combined metric (block 410) is implemented by the detector circuit 306 (FIG. 3) using the same or similar techniques as discussed above with regard to the sync mark detector circuits 204-1 and 204-2 (FIG. 2). Since multiple read sensors (e.g., read heads H1 and H2) are used to read the same set of sector data, embodiments of the invention as described herein for combining independently computed distance metrics (e.g., Metric1, Metric2, etc.) in multiple processing channels, provide improved performance for detecting information patterns, such as synchronization marks, in read channels of storage devices.

In other embodiments of the invention, referring to FIG. 2, the detection results D_comb that are output from the combined sync mark detector circuit 206 can be used to verify the detection results D1 and D2 that are independently determined in the separate processing channels. In particular, with a two-stream framework as shown in FIG. 2, the sync mark detection can be separately performed in each processing channel to yield separate detection results D1 and D2 at the output of the sync mark detector circuits 204-1 and 204-2. These detection results D1 and D2 can be compared to the combined detection result D_comb that is output from the combined sync mark detector circuit 206 to verify quality of the results. For example, if the individual detection results D1 and D2 are the same as the combined detection result D_comb, then it can be concluded that the functionality of the read heads H1 and H2 and overall detection are of good quality. If only one of the individual detection results D1 or D2 are the same as the combined detection result D_comb, then it can be concluded that the overall detection ability of the system is of medium quality. If none of the individual detection results D1 and D2 matches the combined detection result D_comb, then it can be concluded that the overall detection ability of the system is of poor quality. Moreover, if it is determined during run-time, for example, that |SNR1−SNR2| is greater than some predefine threshold, the system can select one of the metrics (e.g., Metric1 or Metric2) associated with the good quality read head (e.g., H1 or H2) to perform sync mark detection so as to avoid correlated noise.

Figure 5:
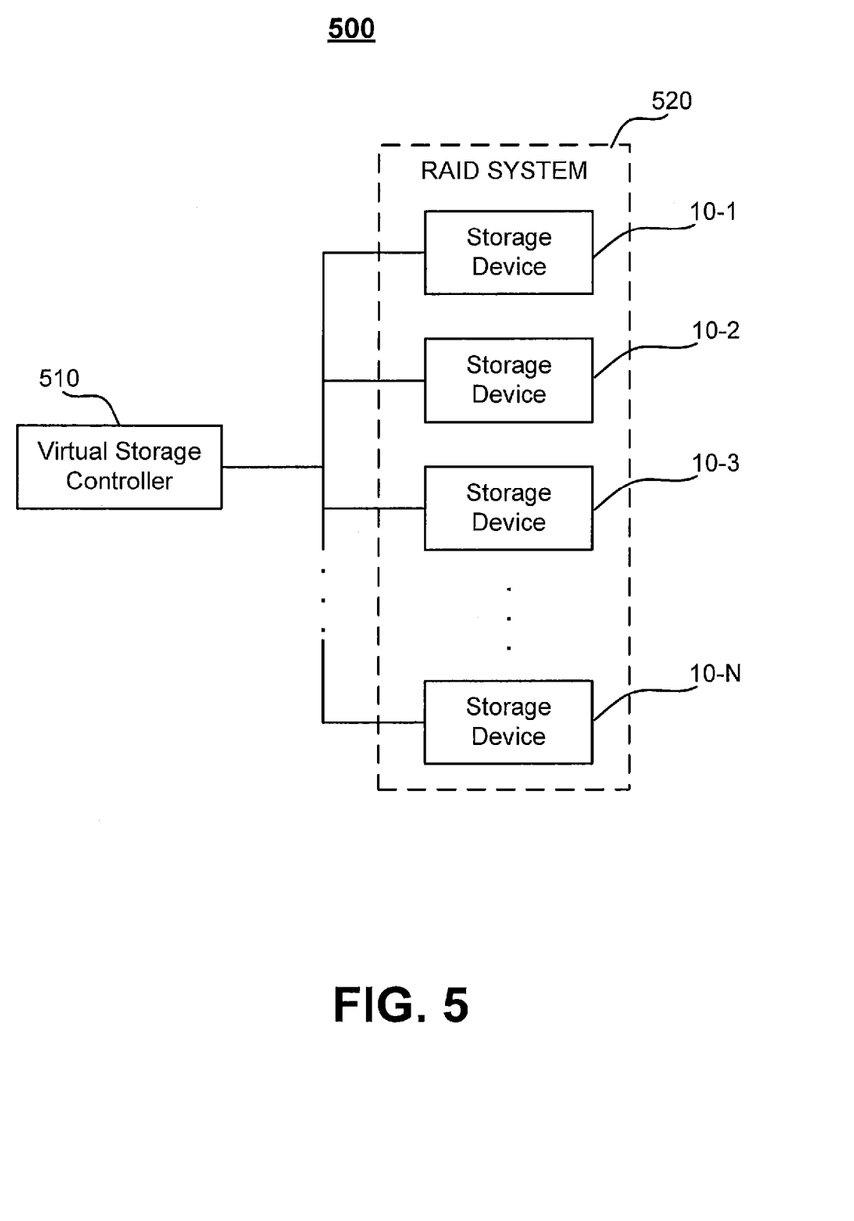
FIG. 5 shows a virtual storage system incorporating a plurality of disk-based storage devices of the type shown in FIG. 1.

In another embodiment of the invention, multiple disk-based storage devices 10 (of FIG. 1) may be incorporated into a virtual storage system 500 as illustrated in FIG. 5. The virtual storage system 500, also referred to as a storage virtualization system, illustratively comprises a virtual storage controller 510 coupled to a RAID system 520, where RAID denotes Redundant Array of Independent Disks. The RAID system 520 comprises N distinct storage devices denoted 10-1, 10-2, . . . , 10-N, one or more of which are assumed to be configured to include embodiments of the storage system 10 as shown in FIG. 1 and sync mark detection circuitry for performing pattern detection, according to embodiments of the invention as discussed herein. These and other virtual storage systems comprising hard disk drives or other disk-based storage devices of the type disclosed herein are considered embodiments of the invention. A host processing device may also be an element of a virtual storage system, and may incorporate the virtual storage controller 510.

Although embodiments of the invention have been described herein with reference to the accompanying drawings, it is to be understood that embodiments of the invention are not limited to the described embodiments, and that various changes and modifications may be made by one skilled in the art resulting in other embodiments of the invention within the scope of the following claims.

What is claimed is:

1. A method, comprising:
    receiving a first sample stream corresponding to recorded information sensed from a target location using a first sensor;
    receiving a second sample stream corresponding to recorded information sensed from a target location using a second sensor;
    computing a first metric by comparing the first sample stream to a reference pattern corresponding to a target information pattern;
    computing a second metric by comparing the second sample stream to the reference pattern;
    computing a combined metric by combining the first metric and second metric using a weighting function; and
    detecting the target information pattern using the combined metric.

2. The method of claim 1, wherein the target location comprises a given sector on a track of the storage medium, and wherein the target information pattern to be detected comprises a synchronization mark within the given sector.

3. The method of claim 1, further comprising aligning bit positions of the second metric of the second sample stream to corresponding bit positions of the first metric of the first sample stream.

4. The method of claim 3, wherein aligning comprises applying the second metric to a FIFO (first-in-first-out) delay buffer.

5. The method of claim 1, wherein computing a combined metric by combining the first metric and second metric using a weighting function comprises:
    applying a first weight to the first metric to generate a first weighted metric;
    applying a second weight to the second metric to generate a second weighted metric; and
    generating the combined metric by adding the first weighted metric and the second weighted metric.

6. The method of claim 5, further comprising determining the first weight as a function of a variance of the first metric and a variance of the second metric.

7. The method of claim 5, further comprising determining the first weight as a function of a first signal-to-noise ratio of at least a portion of the first sample stream and a second signal-to-noise ratio of at least a portion of the second sample stream.

8. The method of claim 5, further comprising:
    determining a first signal-to-noise ratio of at least a portion of the first sample stream;
    determining a second signal-to-noise ratio of at least a portion of the second sample stream; and
    accessing a value of the first weight from a lookup table, wherein the lookup table comprises a plurality of first weight values that are each indexed by at least a first predefined signal-to-noise ratio value and a second predefined signal-to-noise ratio value.

9. A data processing system, comprising:
    a first metric computation engine to receive a first sample stream, wherein the first sample stream is obtained by sensing recorded information at a target location of a storage medium using a first sensor, and to compute a first metric by comparing the first sample stream to a reference pattern that is representative of a target information pattern to be detected;
    a second metric computation engine to receive a second sample stream, wherein the second sample stream is obtained by sensing the recorded information at the target location of the storage medium using a second sensor, and to compute a second metric by comparing the second sample stream to the reference pattern; and
    detector circuitry to compute a combined metric by combining the first metric and second metric using a weighting function, and to detect a target information pattern using the combined metric.

10. The data processing system of claim 9, wherein the target location comprises a given sector on a track of the storage medium, and wherein the target information pattern comprises a synchronization mark within the given sector.

11. The data processing system of claim 9, further comprising a FIFO (first-in-first-out) delay buffer to align bit positions of the second metric of the second sample stream to corresponding bit positions of the first metric of the first sample stream.

12. The data processing system of claim 9, wherein the detector circuitry comprises:
    first multiplication circuitry to apply a first weight to the first metric to generate a first weighted metric;
    second multiplication circuitry to apply a second weight to the second metric to generate a second weighted metric; and
    adder circuitry to add the first weighted metric and the second weighted metric to generate the combined metric.

13. The data processing system of claim 12, further comprising weight computation circuitry to determine the first weight as a function of a variance of the first metric and a variance of the second metric.

14. The data processing system of claim 12, further comprising weight computation circuitry to determine the first weight as a function of a first signal-to-noise ratio of at least a portion of the first sample stream and a second signal-to-noise ratio of at least a portion of the second sample stream.

15. The data processing system circuit of claim 12, further comprising weight computation circuitry to determine a first signal-to-noise ratio value of at least a portion of the first sample stream, determine a second signal-to-noise ratio value of at least a portion of the second sample stream, and use the first and second signal-to-noise ratio values to access a value of the first weight from a lookup table, wherein the lookup table comprises a plurality of first weight values that are each indexed by at least a first predefined signal-to-noise ratio value and a second predefined signal-to-noise ratio value.

16. A storage device comprising:
- a storage medium;
- a read head configured to read data from the storage medium, wherein the read head comprises at least a first read sensor and a second read sensor; and
- read channel circuitry comprising a detection circuit to detect a pattern within information read from the storage medium, wherein the detection circuit comprises:
  - a first metric computation engine to receive a first sample stream, wherein the first sample stream is obtained by sensing recorded information at a target location of the storage medium using the first read sensor, and to compute a first metric by comparing the first sample stream to a reference pattern representative of a target information pattern to be detected;
  - a second metric computation engine to receive a second sample stream, wherein the second sample stream is obtained by sensing the recorded information at the target location of the storage medium using the second read sensor, and to compute a second metric by comparing the second sample stream to the reference pattern; and detector circuitry to detect a target information pattern using the combined metric.

17. The method of claim 1, wherein the method further comprises:
- obtaining the first sample stream by converting a first analog read signal derived from the first sensor to a time-sequenced digital sample stream comprising samples of the first analog read signal; and
- obtaining the second sample stream by converting a second analog read signal derived from the second sensor to a time-sequenced digital sample stream comprising samples of the second analog read signal.

18. The method of claim 17, wherein:
obtaining the first sample stream further includes:
- equalizing the time-sequenced digital sample stream comprising samples of the first analog read signal to yield the first sample stream; and obtaining the second sample stream further includes:
- equalizing the time-sequenced digital sample stream comprising samples of the second analog read signal to yield the second sample stream.

19. The data processing system of claim 9, wherein the data processing system is implemented as part of an integrated circuit.

20. The storage device of claim 16, wherein the storage device is implemented as part of a virtual storage system.

* * * * *